United States Patent Office 3,523,870
Patented Aug. 11, 1970

3,523,870
STEROID TRANSFORMATION BY ENZYMES
OF *ASPERGILLUS TAMARII*
Donald R. Brannon, Indianapolis, Ind., assignor to the United States of America as represented by the Secretary of the Army
No Drawing. Filed Sept. 5, 1967, Ser. No. 665,947
Int. Cl. C07c *167/08*
U.S. Cl. 195—51                                     10 Claims

ABSTRACT OF THE DISCLOSURE

A process for the transformation of androstane and pregnane steroids to known hydroxy derivatives thereof and in some instances D-ring lactone derivatives by subjecting the steroids to the actions of enzymes obtained by the aerobic fermentation of *Aspergillus tamarii* and to two novel steroid compounds 5α-androstane-3α,11α-diol-17 one and 5α-androstane-6 β-ol-3,17-dione obtained thereby.

---

The invention described herein may be manufactured, used, and licensed by or for the Government for governmental purposes without the payment to me of any royalty thereon.

This invention relates to a novel method of altering the chemical structure of a series of steroid compounds and to novel steroids obtained thereby, and, more particularly, to the transformation of steroid compounds by means of enzymes produced by the growth of *Aspergillus tamarii*.

The present invention provides a novel process for introducing hydroxyl groups at certain selected sites on the steroid nucleus by means of enzymes obtained from the aerobic fermentation of *A. tamarii*. In addition, this process will in certain instances reduce ketones to hydroxyl groups and cause sequential side-chain cleavages with D-ring lactone formation. The process of this invention is advantageous in that it results in the efficient and economical conversion of known steroid compounds to other known steroids, most of which are known to possess hormonal activity. Of further advantage is the fact that this process obtains high conversion yields at room temperature, and obtains higher yields than conversion processes heretofore employed.

This process has also resulted in the production of two novel compounds, 5α-androstane-3α,11α-diol-17 one and 5α-androstane-6 β-ol-3,17-dione. The former compound is useful as an intermediate in the formation of the antigonadotropin, 5α-androstane-3,11,17-trione. Both compounds are useful as intermediates in the preparation of other steroids by known processes, and are useful in steroid research.

The process of my invention may be applied to a number of steroid compounds selected from the androstane and pregnane series, more generally to such compounds having a hydroxyl or keto group in the 3 position, having a keto, hydroxyl or alkyl group in the 17 position, and in some instances having double bonds in the 1 and/or 4 positions. Typical examples of the steroid compounds which can be employed herein include androsterone, isoandrosterone, 1,4 - androstadiene - 3,17 - dione, andrenosterone, 4-androsterone - 3,11,17 - trione, 5β - androstane-3,17-dione, 5α-androstane-3,17-dione, androstanolone, 5α-pregnane-3,20-dione.

The foregoing compounds as well as other steroid compounds may be added to the microbial growth medium either at the beginning or during or at the end of growth either in crystalline form or dissolved in a suitable solvent such as dimethylformamide. Nutrient solutions used for the growth of fungal organisms are well known in the art and principally consist of (1) a source of carbon such as glucose, maltose, sucrose, starch, dextrine and vegetable oils and (2) a source of nitrogen such as ammonia salts, meat and fish flours and other nutritive substances containing nitrogen (3) inorganic salts such as sodium, potassium, magnesium, sulfates, phosphates and chlorides, and, optionally, trace elements. The foregoing materials are added to a quantity of distilled water, and the solution is sterilized prior to inoculation with the microorganism culture.

The microorganism used in the present invention is *A. tamarii* Kita QM 1223. While any form of aerobic incubation is suitable for the growth of this organism, the efficiency of the enzymatic transformation of the steroid substrates is related to the availability of oxygen. Therefore, it is desirable that aeration of the fermentation medium be effected in some manner as by agitation of the medium or by bubbling an oxygen containing gas through the medium. The temperature of the inoculated medium during the period of incubation may be the same as that suitable for fungal growth. With the instant organism, however, it has been found that incubation and the steroid transformation can be satisfactorily accomplished within reasonable time periods at room temperature e.g., between about 20 to 30° C. While the time required for the transformation of the steroid compounds varies within wide limits, adequate yields may be obtained within time periods of from about 8 to 96 hours.

The steroid materials are recovered from the culture by known extraction processes. One such process involves extracting the fermentation liquor and mycelia with a water immiscible organic solvent such as chloroform, methylene dichloride or ethyl acetate. The resulting extract may be concentrated and dried under vacuum or, the steroid recovered by recrystallization from organic solvents or their chromatography.

The following examples are illustrative of the process and products of the present invention and are not to be construed as limiting:

EXAMPLE 1

A fermentation medium was prepared consisting of 50 g. of glucose, 2.4 g. of ammonium nitrate, 2 g. of magnesium sulfate, 10 g. of potassium dihydrogen phosphate, trace elements and 1,000 ml. of distilled water. 100 ml. of a sterile solution of the above was placed within a 250 ml. flask and inoculated with *A. tamarii* Kita QM 1223 and incubated at 25° C. for 96 hours on a rotary shaker. A solution of 50 mg. of androsterone (5α-androstane-3α-ol-17-one), an androgenic steroid, and thyromimetic, dissolved in 0.4 ml. of dimethylformamide was then added to the flask which was incubated for another 96 hours at the same temperature on a rotary shaker. An average of 2 g. of dry mycelium was obtained from each of 20 flasks so cultured after the total of 8 days. The flask contents were combined and the mycelium filtered off and washed with chloroform. The aqueous filtrate was extracted by stirring for 24 hours with half of its volume of chloroform. This chloroform extract was combined with the chloroform washings from the mycelia, dried over anhydrous magnesium sulfate and concentrated to dryness under vacuum yielding 550 mg. of partially crystalline material which was chromatographed on 35 g. of alumina. Fisher absorption alumina A–540 (activity III) was used for alumina column chromatography.

Elution with methanol-ether (1:99) gave 310 mg. of 5α-androstane-3α,11β-diol-17-one which crystallized upon removal of the solvent. The infrared spectrum of this compound was superimposable on that of an authentic 5α-androstane-3α,11β-diol-17-one.

Elution with methanol-ether (3:91) gave 70 mg. of impure material which was rechromatographed on 10 g. of alumina. Elution with methanol-ether (2:98) gave 45 mg. of 5α-androstane-3α,11α-diol-17-one, a novel compound, which crystallized upon removal of the solvent: M.P. 214–216°; [α]$^{23}$D+11° (c. 0.3, Me$_2$CO);

$$\gamma_{max}^{KBr}: 3400, 1705, 1040 \text{ cm.}^{-1}$$

The mass spectrum of this showed the parent ion at m/e 306.2177.

*Analysis.*—Calcd. for C$_{19}$H$_{30}$O$_3$ (percent): C, 74.47; H, 9.87. Found (percent): C, 74.15; H, 10.03.

EXAMPLE 2

30 mg. of the novel compound of Example 1, 5α-androstane-3α,11α-diol-17-one, in 1 ml. of acetone was added to 15 mg. of chromic oxide in 2 ml. of acetone. After stirring at room temperature for 6 hours the acetone was removed and the residue was partitioned between water and ether. The ether proportion was washed and dryed over magnesium sulfate and the ether was removed to give 22 mg. of non-crystalline solvent which was chromatographed on 10 g. of alumina. Elution with benzene-ether (1:1) gave 5 mg. of 5α-androstane-3,11,17-trione, a compound known to have antigonadotropic properties. An infrared spectrum of this compound was identical with that of an authentic 5α-androstane-3,11,17-trione.

Elution with methanol-ether (1:99) gave 10 mg. of 5α-androstane-11α-ol-3,17-dione. The infrared spectrum of this compound was identical with that of an authentic 5α-androstane-11α-ol-3,17-dione.

EXAMPLE 3

In this example and in the following examples, which describe the microbiological transformation of steroid materials, the same incubating medium, microorganism and incubation conditions are utilized as described in Example 1.

500 mg. of isoandrosterone (5α-androstane-3β-ol-17-one) were incubated and yielded 210 mg. of crude product. Chromatography of the crude product on 10 g. of alumina using ethanol-ether (1:99) as eluent gave 150 mg. of the 5α-androstane-3β,11β-diol-17-one. Recrystallization from ethanol-ether gave an analytical sample, M.P. 228–230°. The infrared spectrum of this compound was identical with that of an authentic sample of 5α-androstane - 3β,11β-diol-17-one, a compound having known androgenic activity.

EXAMPLE 4

The incubation of 1 g. of 1,4-androstadiene-3,17-dione yielded 820 mg. of material whose thin layer chromatogram (methanol-ether, 1:10) showed four components with R$_f$ 0.60, 0.65, 0.80, and 0.75 the latter component being relatively minor. Incubation of this same substrate for only 48 hours yielded a crude product whose layer chromatogram showed the component of R$_f$ 0.60 to be present in a trace amount relative to the components of R$_f$'s 0.65, 0.75 and 0.80. The crude product from the 96 hour conversion was chromatographed on 20 g. of alumina.

Elution with ether gave 210 mg. of 1,4-androstadiene-11β-ol-3,17-dione, R$_f$ 0.80. Recrystallization from ether gave an analytical sample, M.P. 178–180°.

*Analysis.*—Calcd. for C$_{19}$H$_{24}$O$_3$ (percent): C, 75.97; H, 8.05. Found (percent): C, 75.70; H, 8.22.

The infrared spectrum of this compound was found to be identical with that of an authentic sample.

Further, elution with ether gave 311 mg. of crystalline metabolite 1,4-androstadiene-17β-ol-3-one; R$_f$ 0.75, M.P. 165–166°. The infrared spectrum of this compound was found to be identical with the spectrum of a commerical sample of 1,4-androstadiene-17β-ol-3-one.

Elution with methanol-ether (1:99) gave 14 mg. of 1,4-androstadiene-11β,17β-diol-3-one: R$_f$ 0.65, M.P. 210–212°.

*Analysis.*—Calcd. C$_{19}$H$_{24}$O$_3$ (percent): C, 75.97; H, 8.06. Found (percent): C, 75.90; H, 8.01.

The infrared spectrum of this compound was identical to that of an authentic sample of 1,4-androstadiene-11β,17β-diol-3-one.

Elution with methanol-ether (3:97) gave 183 mg. of 1,4-androstadiene-11α-ol-3,17-dione, R$_f$, 0.60. This compound is biologically active and produces androgen hormone action (see U.S. Pat. 2,902,498). Recrystallization from ether gave an analytical sample: M.P. 210–212°. 20 mg. of this compound in 1 ml. of acetone is added to a solution of 10 mg. of CrO$_3$ in 2 ml. of acetone. After stirring at room temperature for 12 hours, the acetone was removed under vacuum and the residue partitioned between ether and water. The ether portion was separated and the ether evaporated to give 13 mg. of the androgen, 1,4-androstadiene-3,11,17-trione (adrenosterone). The infrared spectrum of this trione was identical to that of a commercial sample of 1,4-androstadiene-3,11,17-trione.

EXAMPLE 5

500 mg. of 1,4-androstadiene-3,11,17-trione (adrenosterone) were incubated as in Example 1 and gave 208 mg. of 1,4-androstadiene-17β-ol-3,11-dione, a compound known to produce androgenic activity (see U.S. Pat. 2,952,693). Crystallization from methanol-ether gave crystals: M.P. 230–232°;

$$\gamma_{max}^{KBr}: 3420, 1700, 1655, 1610 \text{ and } 1590 \text{ cm.}^{-1}$$

[α]$^{25}$D+158° (c. 0.1, Me$_2$CO). Lit. M.P. 233.5–34.5°, [α]$^{25}$D+169°.

*Analysis.*—Calcd. for C$_{19}$H$_{24}$O$_3$ (percent): C, 75.97; H, 8.05. Found (percent): C, 76.20; H, 8.11.

EXAMPLE 6

500 mg. of 4-androstene-3,11,17-trione were incubated and gave 370 ml. of crude transformation product which was extracted with ether to give 230 ml. of a crystalline androgenic compound 4-androstene-17β-ol-3,11-dione: M.P. 180–181°; [α]$^{25}$D+178° (c. 0.1, Me$_2$CO);

$$\gamma_{max}^{KBr}: 3420, 1700, 1660, 1610 \text{ cm.}^{-1}$$

(lit. M.P. 177–180°, [α]$^{25}$D+182.4°).

*Analysis.*—Calcd. for C$_{19}$H$_{26}$O$_3$ (percent): C, 75.46; H, 8.67. Found (percent): C, 75.61; H, 8.75.

A thin layer chromatogram of the crude transformation product showed no trace of either the 11α or 11β-hydroxy derivative of 4-androstene-3,17-dione.

EXAMPLE 7

500 mg. of 5β-androstane-3,17-dione were incubated and gave 360 mg. of crude transformation product. A thin layer chromatogram (ethyl acetate) showed several trace components but only 1 major component. The crude extract was chromatographed on 25 g. of alumina. Elution with ether-benzene (1:10) gave 52 mg. of the starting dione. Elution with methanol-ether (1:99) gave 240 mg. of 5β-androstane-7β-ol-3,17-dione. 50 mg. of this compound in 3 ml. of acetone were added to 20 mg. of CrO$_3$ in 2 ml. of acetone. After stirring at room temperature for 12 hours, the acetone was removed and the acetone was partitioned between water and ether. The ether fraction was removed and the ether evaporated to give 32 ml. of the androgen, 5β-androstane-3,7,17-trione which crystallized upon addition of ethyl acetate and has M.P. 220–221°. The infrared spectrum of this crystalline material was identical with that of an authentic sample of 5β-androstane-3,7,17-trione.

EXAMPLE 8

1 g. of 5α-androstane-3,17-dione gave 720 mg. of crude transformation product which incubated as in Example 1 which product was chromatographed on 25 g. of alumina. Elution with ether-benezene (1:10) gave 52 mg. of crystalline starting dione. Elution with ether gave 230 ml. of 5α-androstane-6β-ol-3,17-dione, a novel compound, which crystallized upon addition of ethyl acetate: M.P. 215-dec.; [α]$^{27}$D—12° (c. 0.1, Me$_2$CO);

$\gamma_{max}^{KBr}$ 3410, 1700–1720, 1420, 1180 and 1060 cm.$^{-1}$

The NMR spectrum showed signlets at 56 (3H), 75 (3H), and a multiplet at 233 (1H) cps. and confirmed the presence of only one hydroxyl group. The mass spectrum of this compound showed the parent ion at m/e 304.

Analysis.—Calcd. for C$_{19}$H$_{28}$O$_3$ (percent): C, 74.96; H, 9.27. Found (percent): C, 75.30; H, 9.31.

Elution with methanol-ether (3:97) gave 310 mg. 11β-hydroxy-5α-dihydro-testololactone. Recrystallization from ethyl acetate gave an analytical sample: M.P. 260–263° dec.; [α]$^{27}$D—12° (c. 0.1, Me$_2$CO);

$\gamma_{max}^{KBr}$ 3400, 1705, 1220, 1090 and 1035 cm.$^{-1}$

The mass spectrum of this compound exhibited the parent ion at m/e 320.

Analysis.—Calcd. for C$_{19}$H$_{28}$O$_4$ (percent): C, 71.22; H, 8.81. Found (percent): C, 71.41; H, 8.86.

The infrared spectrum for this compound was identical with that of authentic 11β - hydroxy-5α - dihydrotestololactone. This compound is useful as a hypotensive agent, is used in treating allergic arteritis and demonstrates anti-inflammatory activity in animals.

EXAMPLE 9

50 mg. of 5α-androstane-6β-ol-3,17-dione, the novel compound produced in Example 8, are dissolved in 3 ml. of acetone and added to 25 mg. of CrO$_3$ in 3 ml. of acetone. After stirring at room temperature for 12 hours, the acetone was removed under vacuum and the residue was partitioned between water and ether. The ether partition was removed and the ether evaporated to give 38 mg. of 5α-androstane-3,6,17-trione. Recrystallization from ether gave crystals having an M.P. of 194–196°. The infrared spectrum of these crystals was identical with an authentic spectrum of 5α-androstane-3,6,17-trione.

EXAMPLE 10

1.25 g. of androstanolone (5α-androstane-17β-ol-3-one was incubated and gave 810 mg. of crude product which was chromatographed on 25 g. of alumina.

Elution with benzene gave 179 mg. of crystals whose R$_f$ value on thin layer chromatogram, specific rotation, and infrared spectrum were identical to those of the androgenic compound, 5α-androstane-3,17-dione.

Elution with methanol-ether (1:99) gave 250 mg. of 5α-androstane-11β,17β-diol-3-one which crystallized upon addition of ethyl acetate: M.P. 254–256°. The infrared spectrum were superimposable on that of an authentic sample of 5α-androstane-11β,17β-diol-3-one.

Elution with methanol-ether (3:97) gave 130 mg. of 11β-hydroxy-5α-dihydrotestololactone whose M.P., elemental analysis, and infrared spectrum were identical to those of an authentic sample of the dihydrotestololactone.

EXAMPLE 11

Incubation of 1 g. of 5α-pregnane-3,20-dione gave 690 mg. of a crude product which was chromatographed on 25 g. of alumina.

Elution with benzene gave 40 mg. of 5α-androstane-3,17-dione.

Elution with ether-benzene (1:1) gave 290 mg. of 5α-dihydrotestololactone which crystallized upon addition of ethyl acetate and hexane: M.P. 169–170°, [α]$^{23}$D—15° (c. 0.1, CHCl$_3$) (lit. M.P. 171–172°, [α]$^{23}$D—18°).

Analysis.—Calcd. for C$_{19}$H$_{28}$O$_3$ (percent): C, 74.96; H, 9.27. Found (percent): C, 75.05; H, 9.32.

Elution with ether-benzene (1:10) gave 165 mg. of the starting dione.

Elution with methanol-ether (1:99) gave 85 mg. of material whose M.P. and infrared spectrum were identical with those described for 11β-hydroxy-5α-dihydrotestololactone.

I claim:
1. A process for producing a β-hydroxylated steroid which comprises subjecting a steroid selected from the group consisting of

5α-androstane-3α-ol-17-one,
5α-androstane-3β-ol-17-one,
1,4-androstadiene-3,17-dione,
1,4-androstadiene-3,11,17-trione,
4-androstene-3,11,17-trione,
5β-androstane-3,17-dione,
5α-androstane-3,17-dione,
5α-androstane-17β-ol-13-one
5α-pregnane-3,20-dione.

to the action of enzymes produced by the aerobic fermentation on the fungus, Aspergillus tamarii and recovering the thus produced β-hydroxylated steroid which is hydroxylated in only one of the 6β, 7β, 11β and 17β position to 5α-androstane-3β,11β-diol-17-one.

2. A process according to claim 1 wherein the steroid 5α-androstane-3α-ol-17-one is converted by enzymatic action to 5α-androstane-3α,11β-diol-17-one and 5α-androstane-3α,11α-diol-17-one.

3. A process according to claim 1 wherein the steroid 5α-androstane-3β-ol-17-one is converted by enzymatic action of 5α-androstane-3β,11β-diol-17-one.

4. A process according to claim 1 wherein the steroid 1,4-androstadiene-3,17-dione is converted by enzymatic action to 1,4-androstadiene-11β-ol-3,17-dione, 1,4-androstadiene-17β-ol-3-one, 1,4 - androstadiene-11β,17β-diol-3-one, and 1,4-androstadiene-11α-ol-3,17-dione.

5. A process according to claim 1 wherein the steroid 1,4-androstadiene-3,11,17-trione is converted by enzymatic action to 1,4-androstadiene-17β-ol-3,11-dione.

6. A process according to claim 1 wherein the steroid 4-androstene-3,11,17-trione is converted by enzymatic action to 4-androstene-17β-ol-3,11-dione.

7. A process according to claim 3 wherein the steroid 5β-androstane-3,17-dione is converted by enzymatic action to 5β-androstane-7β-ol-13,17-dione.

8. A process according to claim 1 wherein the steroid 5α-androstane, 3,17-dione is converted by enzymatic action to 5α-androstane-2,17-dione, 5α-androstane-11β,17β-5α-dihydrotestololactone.

9. A process according to claim 1 wherein the steroid 5α-androstane-17β-ol-3-one is converted by enzymatic action to 5α-androstane-3,17-dione, 5α-androstane-11β,17β-diol-3-one and 11β-hydroxy-5α-dihydrotestololactone.

10. A process according to claim 1 wherein the steroid 5α-pregnane-3,20-dione is converted by enzymatic action to 5α-androstane-3,17-dione, 5α-dihydrotestololactone and 11β-hydroxy-5α-dihydrotestololactone.

References Cited

UNITED STATES PATENTS

| 2,649,402 | 8/1953 | Murray et al. | 195—51 |
| 2,666,016 | 1/1954 | Hechter et al. | 195—51 |
| 2,756,179 | 7/1956 | Fried et al. | 195—51 |
| 2,936,312 | 5/1960 | Babcock et al. | 260—397.4 |
| 2,937,192 | 5/1960 | Colton | 260—307.4 |

OTHER REFERENCES

Dulaney et al., Applied Microbiology, vol. 3, pp. 336–340 (1955).

ALVIN E. TANENHOLTZ, Primary Examiner

U.S. Cl. X.R.

260—397.4

UNITED STATES PATENT OFFICE
CERTIFICATE OF CORRECTION

Patent No. 3,523,870                    Dated August 11, 1970

Inventor(s) DONALD R. BRANNON

It is certified that error appears in the above-identified patent and that said Letters Patent are hereby corrected as shown below:

In claim 1, that portion of the last line reading "to 5α-androstane-3β, 11β-diol-17 one" should read --or both the 11β and 17 β positions--.

In claim 7, line 1, the numeral "3" should be --1--.

In claim 8, beginning on line 3 the compounds described as "5α-androstane-2,17-dione, 5α-androstane-11β, 17β-5α-dihydrotestololactone" should read-- 5α-androstane-6β-ol-3,17-dione, and 11β-hydroxy-5α-dihydrotestololactone--.

SIGNED AND SEALED
NOV 24 1970

(SEAL)
Attest:

Edward M. Fletcher, Jr.
Attesting Officer

WILLIAM E. SCHUYLER, JR.
Commissioner of Patents